Figure 2:
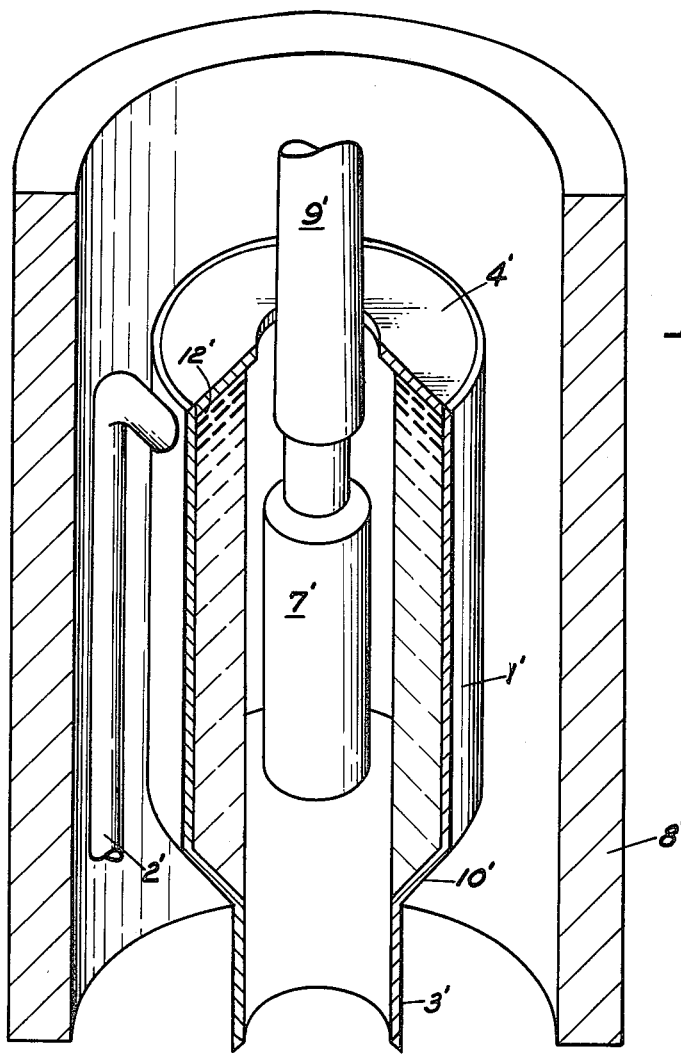

March 13, 1956 W. M. HURST 2,738,426
LIQUID MONITORING DEVICE
Filed Feb. 19, 1952 3 Sheets-Sheet 1
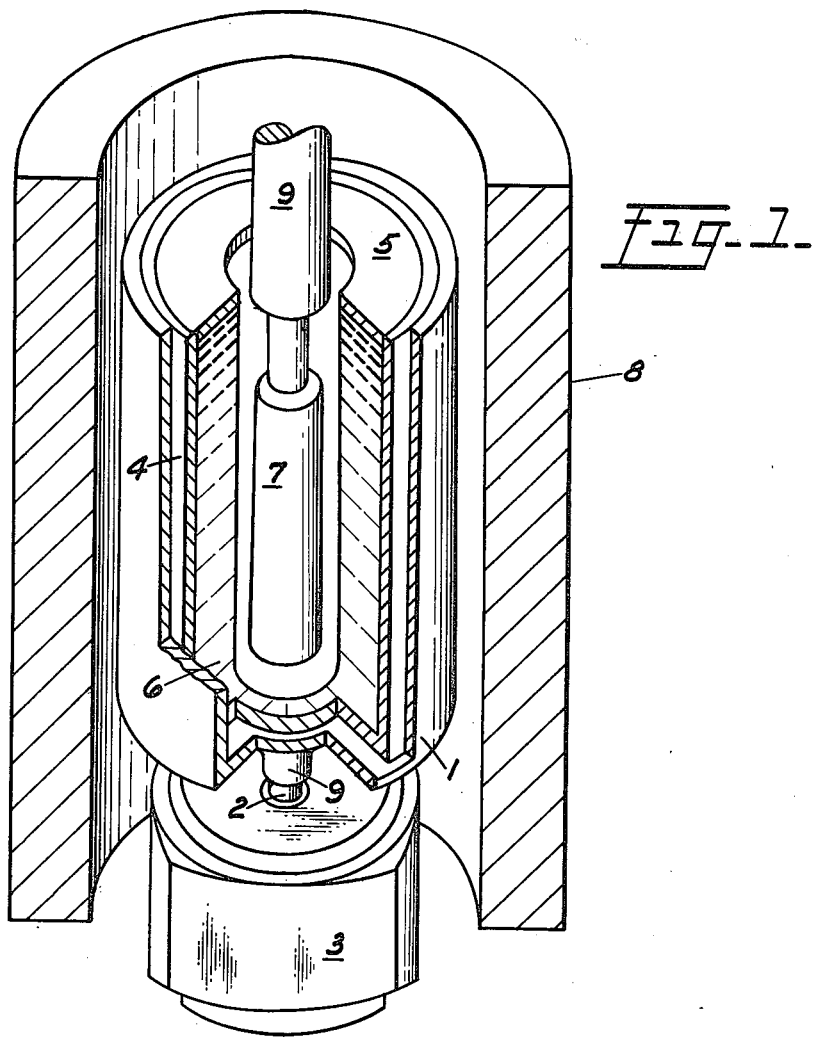
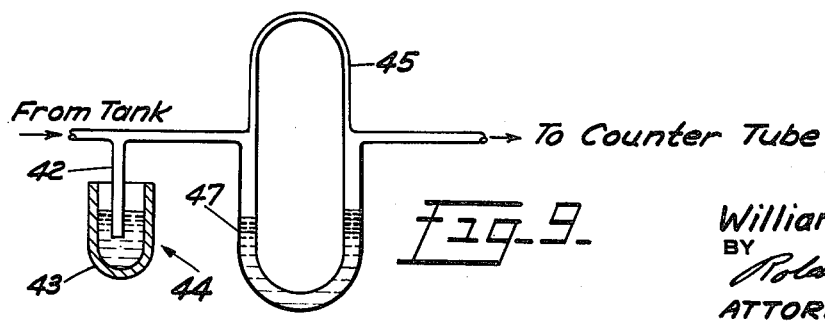
INVENTOR
William M. Hurst
BY
Roland A. Anderson
ATTORNEY March 13, 1956  W. M. HURST  2,738,426
LIQUID MONITORING DEVICE
Filed Feb. 19, 1952  3 Sheets—Sheet 2

INVENTOR
William M. Hurst
BY
ATTORNEY

March 13, 1956 W. M. HURST 2,738,426
LIQUID MONITORING DEVICE
Filed Feb. 19, 1952 3 Sheets-Sheet 3
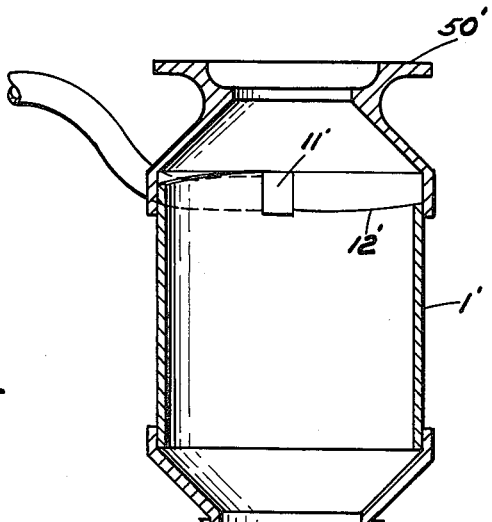
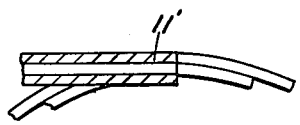
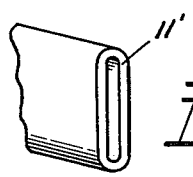
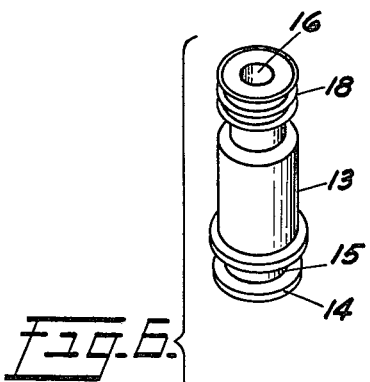
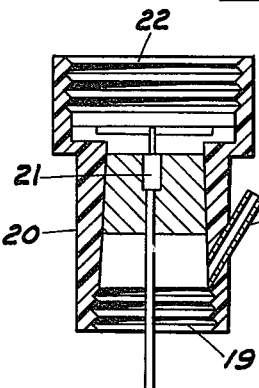
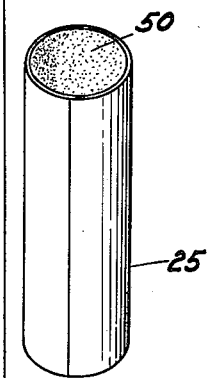
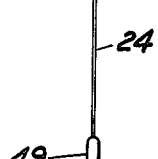
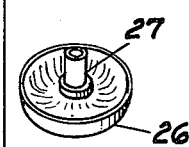
INVENTOR
William M. Hurst
BY
Roland A. Anderson
ATTORNEY

United States Patent Office

2,738,426
Patented Mar. 13, 1956

2,738,426

LIQUID MONITORING DEVICE

William M. Hurst, Oak Ridge, Tenn., assignor to the United States of America as represented by the United States Atomic Energy Commission Application February 19, 1952, Serial No. 272,488

4 Claims. (Cl. 250—43.5)

This invention relates to monitoring systems, and more particularly to a system for monitoring liquids to determine the level of radioactivity therein.

In the prior art, particularly in relation to the monitoring of water to determine the extent of contamination due to radioactivity therein, a number of arrangements have been employed. The problem is particularly important in areas where nuclear reactors are in operation or where radioactive materials are being handled or stored, for sources of water for drinking or other purposes such as cooling or washing must be maintained within certain limits of activity to obviate the possibility of injury from radiation. Water containing unstable isotopes may emit nuclear radiations capable of damaging biological tissue by ionization, and as such could constitute a health hazard irrespective of its chemical properties. Cosmic radiation and various unstable isotopes in nature determine the lower limit of radiation exposure of the human being. For example, there are about 150 grams of potassium in the total body of an adult. Potassium in nature consists of a mixture of the isotopes $K^{39}$, $K^{40}$, and $K^{41}$, the unstable isotope $K^{40}$ constituting about 0.012% of the aggregate. In terms of activity, there is approximately 0.12 microcurie of $K^{40}$ in an adult. The radiation from $K^{40}$ is a mixture of beta particles having energies up to a maximum of 1.36 m. e. v. and gamma rays of 1.462 m. e. v. and is one of the larger factors in assessing the unavoidable radiation exposure of the human being.

In one arrangement of the prior art, a cylindrical curtain of water, sprayed from a perforated ring, falls about a cylindrical type of GM counter tube. However, there is always the danger of contamination of the counter tube itself due to splashing, the beta sensitivity of the counter tube is low because of wall mass acting as an absorber, and the shallow path of water thickness providing the curtain is less than an infinite body radiator. In another arrangement, a number of end window proportional counter tubes are positioned above corresponding trays containing flowing water. The major disadvantage of this system is the relatively small beta admitting area of the thin window of each tube compared to the overall area of the tube, that is, the ratio of gamma ray counting to beta ray admittance area is large compared to a counter constructed almost entirely of beta admitting material. Further the minimum contamination detected by these prior art devices is $1 \times 10^{-4}$ to $1 \times 10^{-5}$ μc. (microcuries) per cc. On the other hand, a maximum drinking water tolerance of about $2 \times 10^{-7}$ μc./cc. has been considered safe when based upon the most harmful radioisotope and upon a 30 years consumption period. For these reasons a more sensitive arrangement is needed to meet the problem.

Applicant with a knowledge of all of these problems in the prior art has for an object of his invention the provision of a monitoring device for liquids which develope centrifugal action in the liquid to obviate splashing and contamination of the counting device.

Applicant has as another object of his invention the provision of a device for continuously monitoring liquids in rotation while preventing their exit except through the outlet.

Applicant has as another object of his invention the provision a monitoring device which concentrates liquids into walls of substantial thickness through centrifugal action to provide a body for increased beta radiation.

Applicant has as a further object of his invention the provision of a monitoring device for liquids which is responsive to and is capable of measuring alpha, beta and gamma radiation.

Applicant has as a still further object of his invention the provision of a counter for a liquid monitoring device which will pass radiations from all directions over a range of 360°.

Applicant has as a still further object of his invention the provision of a counter for a liquid monitoring device which has a thin shell or envelope providing a continuous window for the passage of soft beta radiations.

Other objects and advantages of my invention will appear from the following specification and accompanying drawings, and the novel features thereof will be particularly pointed out in the annexed claims.

Figure 3:
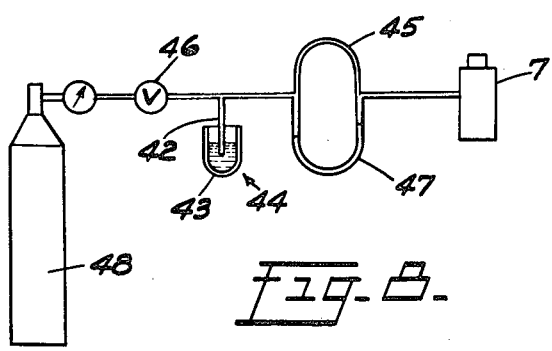

In the drawings, Fig. 1 is a sectional elevation of my improved batch type liquid monitoring device. Fig. 2 is a sectional elevation of my improved continuous flow type liquid monitoring device. Fig. 3 is a sectional elevational of the water cell used in my improved continuous flow liquid monitoring device. Fig. 4 is a detail, partly in section, of the slit type of jet for the water cell of my improved continuous flow liquid monitoring device, and Fig. 5 is an end view of the slit type of nozzle. Fig. 6 is an exploded view of the counter used in my improved liquid monitoring device. Fig. 7 is a sectional detail of the base of the connector used in my improved monitoring device. Fig. 8 is a schematic of a system for feeding gas to the counter. Fig. 9 is a schematic of limiting and metering devices for my improved system.

Referring to the drawings in detail, and particularly to Fig. 1, which shows an apparatus for monitoring finite samples, 1 designates a balanced cylindrical receptacle having a portion 9 depending downwardly from the central extremity thereof to form a hub for the reception of the end of a drive shaft 2 of a motor 3. The hub and shaft may be interlocked to rotate together by any appropriate arrangement, such as by keying or by using a set screw (not shown). A removable cup 4 is positioned within the receptacle 1 in tight frictional engagement with the walls thereof. An annular or ring shaped cover 5 is secured integrally or otherwise to the upper end of sample tube 4. The width of the cover 5 is made sufficiently great so as to maintain a liquid wall 6 of thickness equal to the range of the most energetic beta ray commonly encountered in water. By employing a thick liquid wall as distinguished from the thin water curtain of the prior art, the number of high energy betas contained in and capable of passing out from the liquid wall will be greatly increased, and this will provide a stronger source of radiation for detection. In one embodiment the sample cup has a total volume of 130 cc. and is adapted to receive an 80 cc. sample. When rotated at 1800 R. P. M. the thickness of the liquid in the sample cup is about 1 centimeter, which is the approximate range in water of a 2 k. e. v. beta. However, when the inside diameter of the cup 4 is one and one-half inches, the minimum rotation for desired results and satisfactory liquid wall thickness, when the liquid is water, is about 1200 R. P. M.

A special type of thin window proportional counter 7, to be described more in detail hereinafter, is suspended from a rigid support 9 having an external mounting (not shown). It is inserted through the opening in the cover 5 after the wall of water is established by rotation of the receptacle 1 at the predetermined speed. The centrifugal force on the rotating mass of water prevents it from coming into contact with or splashing the counter case or envelope, and thereby contaminating it. For protection of operating personnel, a biological shield 8 in the form of a lead cylinder, or other appropriate material, is employed to surround or enclose the unit.

The modification of Figs. 2, 3 and 4 is of a continuous liquid monitoring device as distinguished from the batch type of Fig. 1. A cylindrical receptacle 1' is provided with a tangential liquid inlet line 2' adjacent the upper end, a concentric outlet 3' at the lower end, and a ring shaped cover or top 4' integrally secured to the upper extremity thereof. The receptacle 1' is stationary and liquid is continuously injected at a tangent into this stationary receptacle to cause rotation of the stream within a circular path of confinement. In this arrangement the lower end of the cylindrical receptacle 1' terminates in portion 10' which bridges the receptacle and the outlet 3'. It extends downwardly and inwardly at an angle of about 45° in a manner similar to the upper cover 4', which projects upwardly at substantially the same angle. However, the lower or exit opening for inlet pipe or tube 3' is larger than the upper one in cover 4' so water will flow downward instead of over the top. The nozzle 11' in which inlet line 2' terminates is flattened as indicated in Figs. 4 and 5, for a purpose to be indicated hereinafter. It is positioned in the container or receptacle 1' at a point where the upper edge of the cylindrical portion 12' commences its rise in a 360° spiral to form a uniformly rising cam shaped step. It is preferred that the width of the nozzle 11' coincide with the height of the step, as indicated in Fig. 3. Disposed within the cylindrical receptacle 1' is the special counter 7' suspended from the support 9'. If desired, this support may be arranged to rest upon the upper flange 50' of the receptacle.

As the liquid is injected through the nozzle 11' into the receptacle the stream of liquid becomes a rotating cylindrical wall of liquid of increasing volume and decreasing inside diameter, until the inside diameter of the water outlet in the lower flange is reached and equilibrium is established. The inside diameter of the upper flange where the beta-gamma counter is inserted is smaller than the water outlet so as to prevent undesirable spill-over. In a receptacle whose cylindrical portion is two and one-eighth inches high and two inches in diameter, a water flow of four liters per minute and inlet pressure of twenty pounds per square inch is required to maintain an essentially parallel wall of water of 11 mm. radial thickness.

In this arrangement, there are several factors which prevent turbulence of the liquid wall. The problem is of continuously injecting liquid into a rotating cylindrical wall of water without disturbing the liquid-air boundary. Another consideration is that for a given volume flow of liquid, the liquid jet having a circular cross-section would result in a minimum energy loss caused by the friction of fluid with the jet wall. The circular jet, however, introduces considerable turbulence in the water wall, and a slit jet made by partial flattening of the water inlet tube provided the desired improvement. The remaining amount of turbulence was largely eliminated by having a uniformly rising cam face formed on one end of the cylinder thereby effectively introducing the jet stream not at a point but throughout one revolution of the rotating water wall.

The choice of material with which to construct the water cell will depend upon several factors, including the pH value, the particular isotopes involved, and the level of activity in the water. In general, plating out of activity onto the water cell wall is emphasized if the water cell is metallic or if the water pH value is about 7, but that is of no practical significance for the case of monitoring drinking water since the level of activity is usually less than about $1 \times 10^{-8}$ μc./cc.

The special counter employed in the above arrangement includes a base member or fitting 13 having a series of circular rings 14 separated by grooves 15 formed on its lower extremity. It is bored at 16 to provide a passageway for a collecting wire support 17. The upper end 18 of the fitting has threads for coaction with a socket 19 in a standard amphenol connector shown in Fig. 7. The connector 20 has the rod 17 terminating at its upper end in an enlarged portion 21, seated in an intermediate portion of the connector. The upper end of the connector is threaded at 22 to coact with an appropriate support. A gas flow tube 23 extends into the connector for supplying a gas to the interior of the counter. A .001 inch stainless steel collector wire 24 is suspended from the lower extremity of the rod 17 and forms the inner electrode of the counter. The cylindrical envelope 25 having a gold film 50 on its inner surface is closed by cap 26. This gold film forms the outer electrode of the counter. In this arrangement letter size sheets of 0.0002 inch thick rubber hydrochloride are given a deposit of gold (50 micrograms/cm.$^2$) by evaporation on one face; resistivity of the coating is about five ohms per square and the characteristic green color of gold film transmitted light is seen. A cut to size rectangle of the coated film is wrapped around a polished form with the gold surface inside, and cemented along the lap joint with Tygobond No. 30 to form the thin shell of the counter. A hot sheet formed end cap 26 is cemented to the shell in a similar manner and the assembly air dried for three hours, then raised to 70° C. for ten minutes to remove wrinkles, lowered to room temperature, and then blown, to minimize scratching of the gold film, off the form. The shell is assembled to the fitting to be concentric, tied down with thread, and cemented. Stainless steel wire 0.001 inch diameter, selected for straightness and freedom from fibers is held in the connection pin and the end weight by means of tapered pins. The connection pin, end weight, and tapered pins, must be well polished, and the collector wire and tapered pin must terminate inside of the end weight. During assembly of the counter, the stainless steel collector wire is "dusted off" by lightly playing the discharge from a Tesla coil over it. The collector wire is grounded, while the Tesla coil is discharged to it, to avoid sparkover across insulator surfaces. If the counter shell is normally gas tight, which condition does not occur frequently, a pin hole about 0.001 inch diameter is made in the end cap to permit flow of the counting gas.

Operation of the beta counter requires a flow of counting gas at about 2 mm. Hg differential pressure. The gas flow is from a tank or other source 48, through valve 46 and is metered with an oil manometer 47 measuring the pressure drop across an impedance formed by an eight inch length of 0.031 inch inside diameter stainless steel tube 45. This is used instead of a gas bubbler which may result in spurious counts due to pulsing of the counter shell. A pressure limiting device generally indicated 44 is formed by the inverted tube 42 which will permit gas escape through liquid in container 43 if the pressure rises about 5 mm. Hg. Mechanical vacuum pump oil is used to avoid undesirable vapors. Construction of gas control and some other parts includes careful internal cleaning followed by baking in a vacuum oven to remove water. Water in the gas line seriously affects the counting gas characteristics. In practice, about 10 cc./min. of counting gas flow is adequate and this may be reduced if the counter shell is sufficiently gas tight. When first applying pressure to the system, the connections between the gas flow controls, the gas supply tank, and the alpha-beta counter should be made cautiously after preliminary adjustments of the tank and regulator valves, to avoid blowing oil out or injury to the counter shell.

Where the flexible wire 24 is used in the counter, a fluorethene guide 27 of annular shape at the lower end 26 is designed to receive the weight 49 on the end of the wire 24 and limits its movement, thereby preventing it from coming into contact with the gold coating on the inner surface of the cylinder 25, and producing a discharge. This counter can be operated in several different regions, that is, as an ion chamber, Geiger counter, or proportional counter. The wall is sufficiently thin that 20 kev betas will pass through and be counted. The use of Pliofilm or rubber hydrochloride as the material of the wall elements 25, 26 provides a barrier for water vapor. It is desirable to keep $O_2$ out of the counter since this gas has a tendency to destroy its characteristics.

This thin walled counter presents an envelope which is sufficiently stiff to retain its shape, but which will not be injured when deformed. The 0.7 mg./cm.² Pliofilm passes 20 kev or higher energy betas. Glass or stainless steel wall thickness of commercially available G-M counters pass 160 kev betas.

Although the foregoing invention is especially suited to monitoring water, it may also be used to test other effluents, particularly for detecting low levels of activity.

Having thus described my invention, I claim:

1. A liquid monitoring device for determining radioactivity comprising a container having an inturned ring shaped upper end defining a restricted opening, said container being adapted to receive liquid, means for rotating the liquid at a predetermined speed to cause it to move up the walls of the container and produce a liquid wall whose thickness is limited by said upper end and of a configuration to provide a bore of greater diameter than said opening, and a counter means extending through said opening into the container adjacent to and within said liquid wall for detecting the activity in said liquid.

2. A liquid monitoring device for determining radioactivity comprising a container of elongated configuration for receiving liquid, a centrally positioned opening in the upper end of the container of less size than said container for limiting the thickness of the liquid wall formed therein, a receptacle for reception of the container and engageable therewith to rotate it, a power source for rotating the receptacle at a predetermined speed to cause the liquid to rise along the walls of the container under the influence of centrifugal force and define a liquid wall of a predetermined thickness, and a biological shield extending about said receptacle.

3. A liquid monitoring device for determining radioactivity comprising a stationary container for the reception of liquid, means for continuously feeding liquid into said container tangentially to the inner walls thereof to produce rotation of the liquid and set up a liquid wall of predetermined thickness along the inner walls of the container, means for removing liquid from said container, and a counter disposed within the container and positioned adjacent to and within the liquid wall for detecting activity therein.

4. A liquid monitoring device for determining radioactivity comprising a container for the reception of a liquid having a spiral shaped rising wall in an intermediate portion thereof, an opening in the top of said container, a larger opening in the bottom of the container to remove said liquid, means extending through a side wall of the container for continuously feeding liquid into the container tangentially of the spiral wall at the lower end thereof for causing the liquid to rotate and form a liquid wall along the inner walls of the container, and a counter extending into the container through the opening in the top for mounting adjacent to and within the wall of liquid to detect activity therein.

References Cited in the file of this patent

UNITED STATES PATENTS

| | | |
|---|---|---|
| 2,072,417 | Berndt et al. | Mar. 2, 1937 |
| 2,340,967 | Langer | Feb. 8, 1944 |
| 2,368,486 | Mullane | Jan. 30, 1945 |
| 2,494,641 | Anderson et al. | Jan. 17, 1950 |
| 2,542,440 | Victoreen et al. | Feb. 20, 1951 |
| 2,588,716 | Gouchenour et al. | Mar. 11, 1952 |

OTHER REFERENCES

Electron and Nuclear Counters, Korff, Van Nostrand Co., Inc., New York, N. Y., 1946.

Geiger Counter Tubes, Friedman, Proceedings of the I. R. E., vol. 37, #7, July 1949, page 807.